(12) United States Patent
Carlson et al.

(10) Patent No.: US 7,327,564 B2
(45) Date of Patent: Feb. 5, 2008

(54) ENGAGEMENT SYSTEM FOR A MODULE IN AN ELECTRONICS CABINET

(75) Inventors: Grant E. Carlson, Florissant, CO (US); Karl H. Cunha, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 98 days.

(21) Appl. No.: 10/884,313

(22) Filed: Jul. 2, 2004

(65) Prior Publication Data

US 2006/0002093 A1 Jan. 5, 2006

(51) Int. Cl.
G06F 1/16 (2006.01)

(52) U.S. Cl. .............. 361/685; 361/726; 312/223.1
(58) Field of Classification Search .......... 361/679, 361/683, 685, 724–727
See application file for complete search history.

(56) References Cited

U.S. PATENT DOCUMENTS

| | | | |
|---|---|---|---|
| 3,619,019 A * | 11/1971 | Hepker | 312/332.1 |
| 3,725,883 A | 4/1973 | Bennett et al. | |
| 4,669,616 A | 6/1987 | Mazura | |
| 4,754,397 A | 6/1988 | Varaiya et al. | |
| 4,980,800 A | 12/1990 | Furuta | |
| 5,019,948 A | 5/1991 | Steketee et al. | |
| 5,077,722 A * | 12/1991 | Geist et al. | 720/657 |
| 5,124,886 A | 6/1992 | Golobay | |
| 5,126,890 A | 6/1992 | Wade et al. | |
| 5,247,427 A | 9/1993 | Driscoll et al. | |
| 5,379,184 A | 1/1995 | Barraza et al. | |
| 5,483,419 A | 1/1996 | Kaczeus, Sr. et al. | |
| 5,517,373 A | 5/1996 | Hanson | |
| 5,557,186 A | 9/1996 | McMurtrey, Sr. et al. | |
| 5,652,697 A | 7/1997 | Le | |
| 5,729,763 A | 3/1998 | Leshem | |
| 5,738,226 A | 4/1998 | Dean | |
| 5,752,257 A | 5/1998 | Ripoll et al. | |
| 5,781,408 A * | 7/1998 | Crane et al. | 361/683 |
| 5,822,184 A | 10/1998 | Rabinovitz | |
| 5,841,631 A | 11/1998 | Shin et al. | |
| 5,868,261 A | 2/1999 | Collins et al. | |
| 5,913,926 A | 6/1999 | Anderson et al. | |
| 5,933,395 A | 8/1999 | Dang et al. | |
| 5,974,490 A | 10/1999 | Fujimura et al. | |
| 6,008,992 A * | 12/1999 | Kawakami | 361/726 |
| 6,076,142 A | 6/2000 | Corrington et al. | |
| 6,137,684 A * | 10/2000 | Ayd et al. | 361/727 |
| 6,230,217 B1 | 5/2001 | Tuccio et al. | |
| 6,243,790 B1 | 6/2001 | Yorimitsu | |
| 6,252,514 B1 | 6/2001 | Nolan et al. | |

(Continued)

FOREIGN PATENT DOCUMENTS

EP   0126973 A1   4/1984

(Continued)

Primary Examiner—Jayprakash Gandhi
Assistant Examiner—Anthony Q Edwards
(74) Attorney, Agent, or Firm—David K. Lucente; Derek J. Berger

(57) ABSTRACT

An engagement assembly and associate method are provided for a multiple disc array (MDA) that is receivingly engageable in a data storage array cabinet. The engagement assembly comprises a locking device that is responsive to an MDA position indicator in automatically locking and unlocking the module in the cabinet.

8 Claims, 5 Drawing Sheets

U.S. PATENT DOCUMENTS

| | | |
|---|---|---|
| 6,271,604 B1 | 8/2001 | Frank, Jr. et al. |
| 6,317,329 B1 | 11/2001 | Dowdy et al. |
| 6,349,043 B1 | 2/2002 | Jensen et al. |
| 6,356,457 B1 | 3/2002 | Haworth |
| 6,373,712 B1 | 4/2002 | Bailis et al. |
| 6,392,892 B1 | 5/2002 | Sobolewski et al. |
| 6,397,293 B2 | 5/2002 | Shrader et al. |
| 6,442,022 B1 | 8/2002 | Paul |
| 6,464,509 B1 | 10/2002 | Emberty et al. |
| 6,473,261 B1 | 10/2002 | Miller et al. |
| 6,522,553 B2 | 2/2003 | Hardin et al. |
| 6,529,383 B1 | 3/2003 | Barringer et al. |
| 6,532,150 B2 | 3/2003 | Sivertsen et al. |
| 6,549,969 B1 | 4/2003 | Hsu et al. |
| 6,574,687 B1 | 6/2003 | Teachout et al. |
| 6,618,246 B2 | 9/2003 | Sullivan et al. |
| 6,637,719 B2 | 10/2003 | Jiang |
| 6,651,138 B2 | 11/2003 | Lai et al. |
| 6,683,793 B1 | 1/2004 | Campbell et al. |
| 6,707,670 B2 | 3/2004 | Seal |
| 6,774,808 B1 * | 8/2004 | Hibbs et al. ............ 340/686.4 |
| 6,796,715 B2 | 9/2004 | Chiu et al. |
| 6,804,111 B1 * | 10/2004 | Williams et al. ............ 361/685 |
| 6,804,748 B2 | 10/2004 | Bouvier et al. |
| 6,816,370 B2 * | 11/2004 | Searby et al. ............... 361/685 |
| 2002/0144044 A1 | 10/2002 | Moon et al. |
| 2003/0041201 A1 | 2/2003 | Rauscher |
| 2003/0070043 A1 | 4/2003 | Merkey |
| 2003/0081378 A1 | 5/2003 | Debbins et al. |
| 2004/0057203 A1 | 3/2004 | Rabinovitz |
| 2005/0122674 A1 * | 6/2005 | Szolyga et al. ............ 361/685 |
| 2005/0186049 A1 * | 8/2005 | Jones et al. ................ 411/433 |

FOREIGN PATENT DOCUMENTS

| | | |
|---|---|---|
| EP | 1 026 688 A3 | 6/2001 |
| WO | WO 97/45784 | 12/1997 |
| WO | WO 99/60832 | 11/1999 |

* cited by examiner

ENGAGEMENT SYSTEM FOR A MODULE IN AN ELECTRONICS CABINET

FIELD OF THE INVENTION

The embodiments of the present invention relate to the field of modular electronics cabinets and more particularly but without limitation to automatically controlled systems for locking and unlocking a module in a cabinet.

BACKGROUND

Ever-increasing demand for data storage capacity has fostered the development of improved data array storage systems wherein a plurality of data storage devices is electronically linked to function synergistically. Data integrity schemes are also enhanced in such arrays permitting fail-safe redundant storage of data, such as in redundant arrays of independent device ("RAID") systems.

There are a number of challenges facing the array designer. For example, the many and complex mechanical and electrical connections required for each data storage device are multiplied by the number in an array. That is, each and every data storage device requires sufficient mechanical support to isolate the delicate head and disc components from vibration levels that create data transfer errors. Not only must attention be paid to self-excitation, that is, vibration caused by the rotating disc of a data storage device itself, but like attention is required to external excitation sources in such an environment. External excitation can come from other data storage devices in the array, electrical components in the array such as power supplies and fans, and from the installation and/or removal of data storage devices while the array is operational.

As the number of data storage devices in arrays increases, the problems associated with electromagnetic interference containment are exacerbated as well. Properly shielding the data storage devices requires attention paid not only to leak paths between drives in adjacent shelves, but also to the leak paths potentially created by the multiple openings into which each of the plurality of data storage devices is inserted. Adequate shielding of these openings must be provided while still permitting the ability to insert and/or remove a data storage device without disrupting the shielding in place for adjacent data storage devices in the array.

Flexibility can be a problem as well. For instance, the electrical systems, such as the connector boards, controllers, and connecting buses, are hard-wired for a predetermined number and size of data storage devices in the array. This is required to maintain the electrical integrity of the array while permitting swapping of individual data storage devices. For this reason, the storage shelves and the associated electrical systems are dedicated for the predetermined number and size of data storage devices. Accordingly, because of both mechanical and electrical constraints, an array designed for a particular form factor configuration cannot readily be adapted for use with a different form factor. Also, if a grouping of data storage devices is needed for a particular function, such as mirroring the storage of data, such functionality must conventionally be achieved at the top level host programming level. This requires complex and coordinated programming of many data storage devices.

Another flexibility concern is control over the procedure for removing a data storage device, or a group of data storage devices, from service within the array. In use, each data storage device stores some data and commands in volatile memory. During a normal shutdown procedure all needed data and commands, as well as other needed information such as system state information, is written to nonvolatile memory for later use. Removing a data storage device from service before such a shutdown procedure is executed results in lost data and array system control errors.

While various approaches have been proposed in the art to address maximizing the data storage capacity while also providing operable flexibility in the utilization of data storage devices in array storage systems, there nevertheless remains a continued need for improvements in the art. It is to such improvements that the claimed invention is directed.

SUMMARY OF THE INVENTION

In accordance with preferred embodiments of the present invention, an apparatus and method are contemplated for selectively engaging a multiple disc array (MDA) within a data storage array system.

In some preferred embodiments an engagement assembly is provided for an electronic module that is receivingly engageable in a cabinet. The assembly comprises a locking device that is responsive to a module position indicator in automatically locking and unlocking the module.

In other embodiments an MDA is provided comprising a locking device that is responsive to an MDA insertion position indicator in automatically locking and unlocking the MDA in a cabinet.

In other embodiments a cabinet is provided for lockingly retaining a module by steps for engaging the module within a cabinet opening.

These and various other features and advantages which characterize the claimed invention will become apparent upon reading the following detailed description and upon reviewing the associated drawings.

BRIEF DESCRIPTION OF THE DRAWINGS

FIG. 6 showing the unlocked position and FIG. 7 showing the locked position.

FIG. 8 is a flow diagram illustrating steps for engaging an MDA in accordance with embodiments of the present invention.

DETAILED DESCRIPTION

Figure 1:
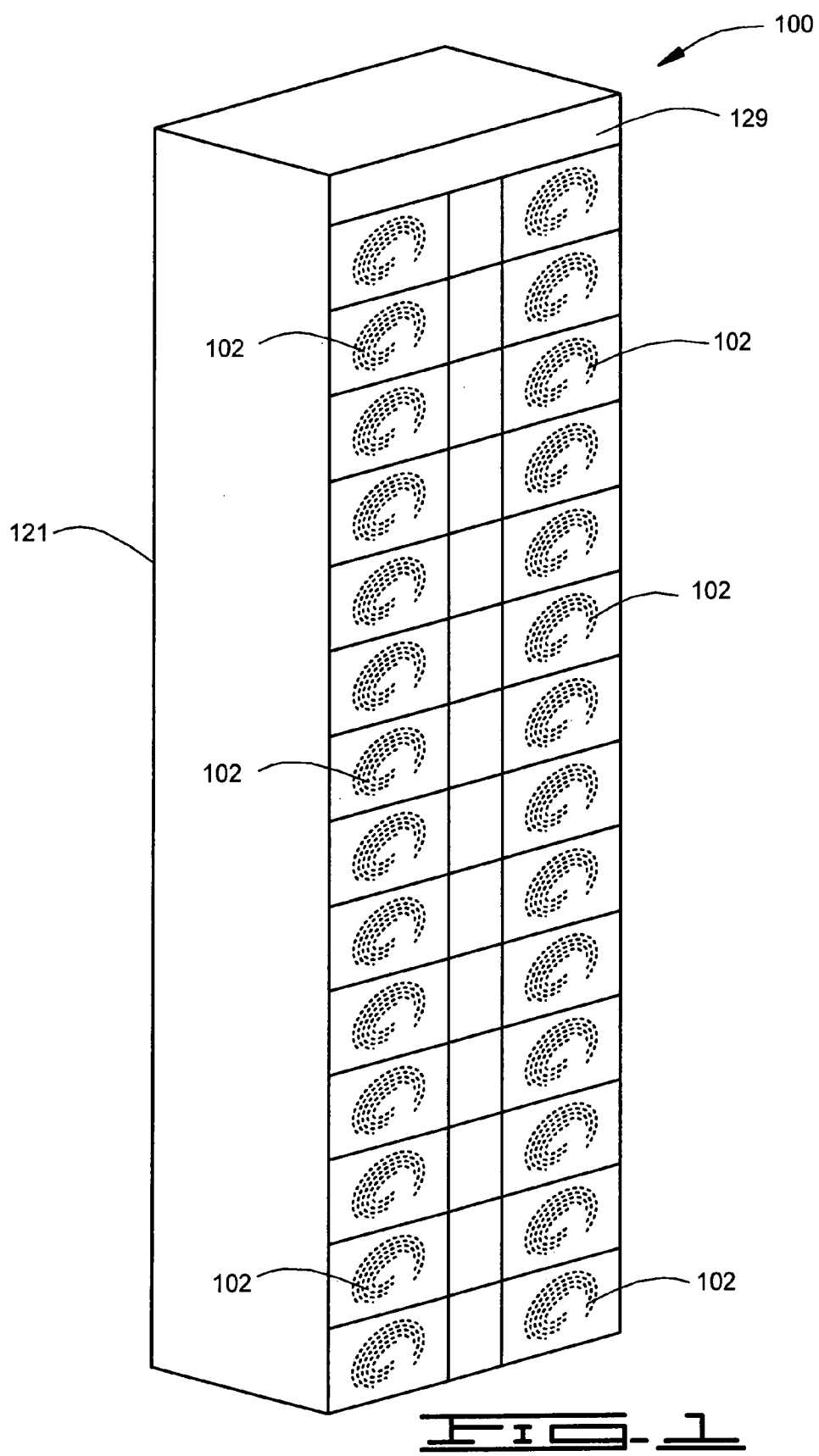
FIG. 1 is an isometric view of an array storage system constructed in accordance with embodiments of the present invention.
Figure 2:
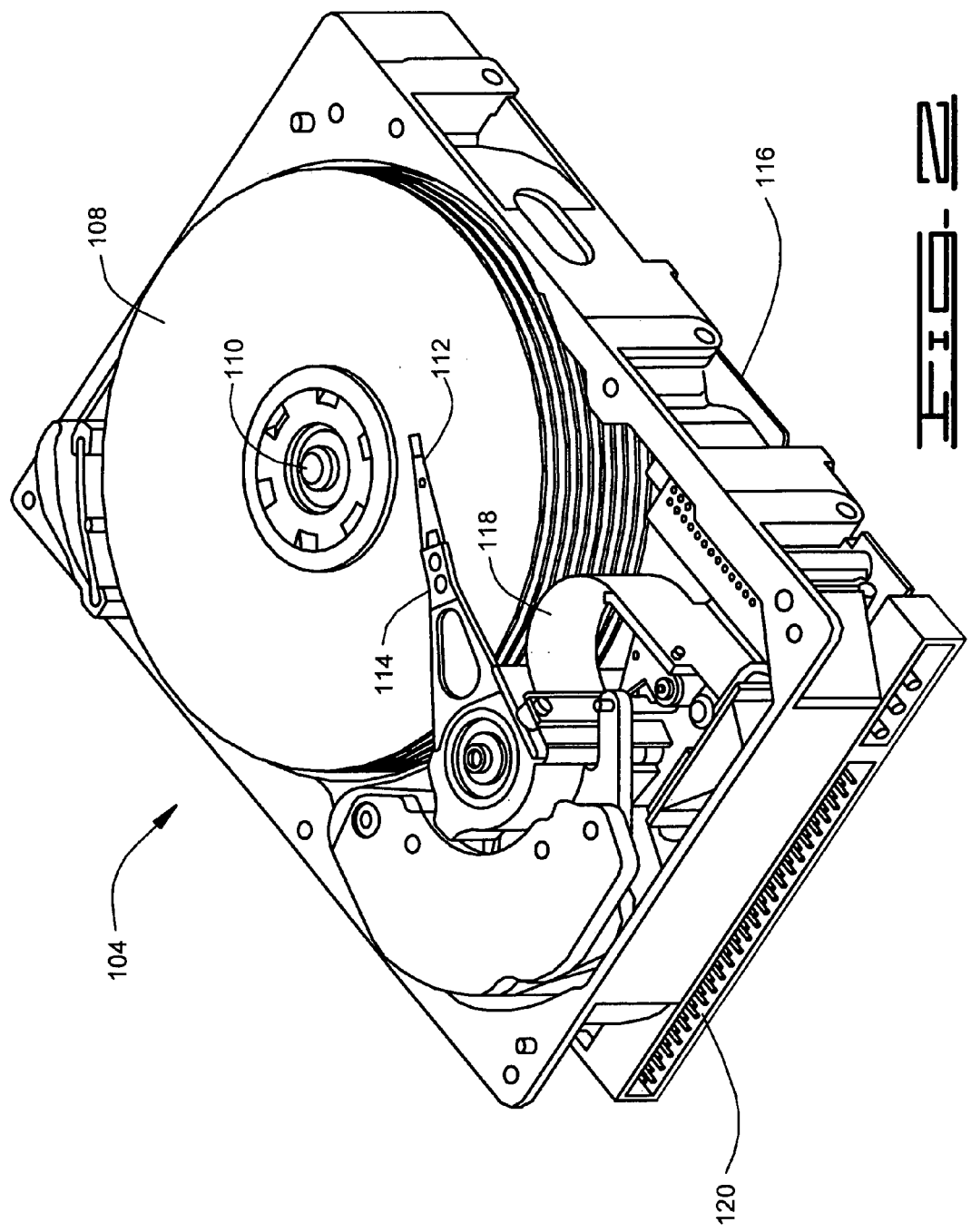
FIG. 2 is an isometric view of a data storage device.

FIGS. 1 and 2 illustrate an array storage system ("array") 100 constructed in accordance with novel embodiments of the present invention, wherein a plurality of multiple disc arrays ("MDAs") 102 are employed, each comprising a number of data storage devices.

FIG. 2 is an isometric view of a data storage device 104 suited for use in the MDA 102, being in the form of a rotating magnetic media disc drive. A data storage disc 108 is rotated by a motor 110 to present data storage locations of the disc 108 to a read/write head ("head") 112. The head 112 is supported at the distal end of a rotary actuator 114 that is capable of moving the head 112 radially between inner and outer tracks of the disc 108. The head 112 is electrically connected to a circuit board 116 by way of a flex circuit 118. The circuit board 116 is adapted to receive and send control signals controlling the functions of the data storage device 104. A connector 120 is electrically connected to the circuit board 116, and is adapted for connecting the data storage device 104 with control electronics of the array 100.

An MDA 201 generally comprises a convertible plurality of componentized data storage devices 104. By "convertible" it is meant that one or more data storage devices 104 can be readily replaced, added, or removed in an existing MDA 102, or that a different MDA can be utilized that is capable of supporting a different number, size or arrangement of data storage devices 104. By "componentized" it is meant that the data storage devices 104 and associated control electronics in the MDA 102 are integrated so as to be functionally presented to the array 100 as a single component.

Figure 3:
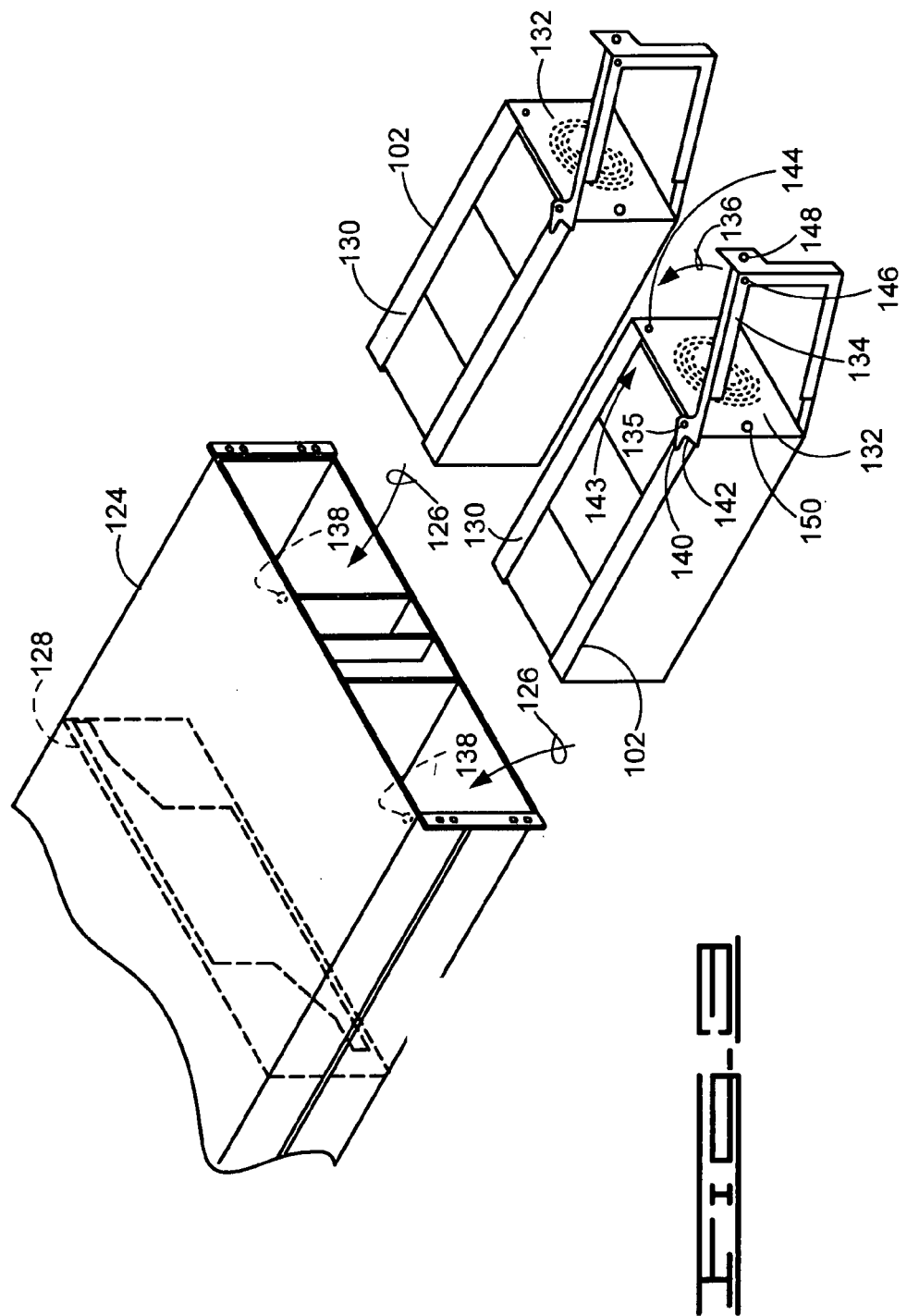
FIG. 3 is an isometric view of two MDAs of the array storage system of FIG. 1.

Considering further now FIG. 3, the array 100 comprises a cabinet 121 defining a plurality of cavities into each of which a shelf 124 is receivingly engaged. Each shelf 124 defines one or more cavities 126 into each of which an MDA 102 is receivingly engaged for electrical engagement with a backplane 128. Similarly, the shelf 124 defines cavities for receivingly engaging other electrical modules (not shown) with the backplane 128. A controller 129 provides top level control of the MDA 102 and other associated modules during array 100 operation.

In the illustrative embodiment of FIG. 3, the shelf 124 defines two cavities 126 for receiving two MDAs 102. Equivalent alternative embodiments contemplate a different number of MDAs 102 per shelf 124. The array 100 comprises a plurality of MDAs 102, each sized in accordance with the respective cavity 126 for an operable mating relationship. Each MDA 102 is adapted to operably support a variable number, size, or arrangement of data storage devices 104. More particularly, this solution provides an array 100 comprising a shelf 124 for receivingly engaging an MDA 102 comprising a carrier 130 from a plurality of different carriers, each carrier of the plurality having common exterior dimensions defining an operable mating relationship with the cavity 126 of the shelf 124, and each carrier of the plurality differentiated by interior supporting features for supporting a selected number, size, or arrangement of data storage devices 104. The carrier 130 can also support a circuit board (not shown). The carrier 130 can also support a wrapper 132 for enclosing the data storage devices 104 and/or the circuit board for electrical shielding. The carrier 130 also preferably comprises one or more guide members that are adapted for aligning with mating features in the backplane 128 to positively align the MDA 102 with the backplane 128 during insertion and electrical connection.

Preferably, the MDA 102 has a controlled insertion and retraction lever 134 that is hinged at joint 135 for movement between a disengaged position, shown in FIG. 3, and an engaged position that is achieved by moving the lever 134 in direction 136. In the disengaged position the MDA 102 is readily insertable and removable into/out of the opening 126. In the disengaged position the MDA 102 can be inserted until a proximal end of the lever 134 abuttingly engages a pin 138 depending from the shelf 124 into the opening 126. Upon engaging the pin 138, movement of the lever 134 toward the engaged position abuttingly engages cam surface 140 of the lever 134 against the pin 138 for imparting a controlled insertion force for electrically connecting the MDA 102 and the backplane 128. Conversely, movement of the lever 134 toward the disengaged position abuttingly engages cam surface 142 of the lever 134 against the pin 138 for imparting a controlled retraction force for electrically disconnecting the MDA 102 from the backplane 128.

Embodiments of the present invention contemplate an engagement assembly 143 comprising a module position indicator 144 that, when activated, indicates an engaged position of the latch 134 such that the MDA 102 is in electrical communication with the backplane 128. The module position indicator 144 can be triggered by a proximity-indicating actuator member 146 that can be brought into engagement with the module position indicator 144 only when the lever 134 is placed in the engaged position. The engagement assembly 143 also comprises a locking device (discussed below) that is responsive to the module position indicator 144 in automatically locking and unlocking the lever 134 in the engaged position. Locking the lever 134 in the engaged position prevents the MDA 102 from physically being removed from the array 100. In some embodiments the locking device comprises an extensible latch that, in a locking position, is receivingly engaged within a strike 148 portion of the lever 134 in order to lockingly retain the lever 134 in the engaged position.

Figure 4:
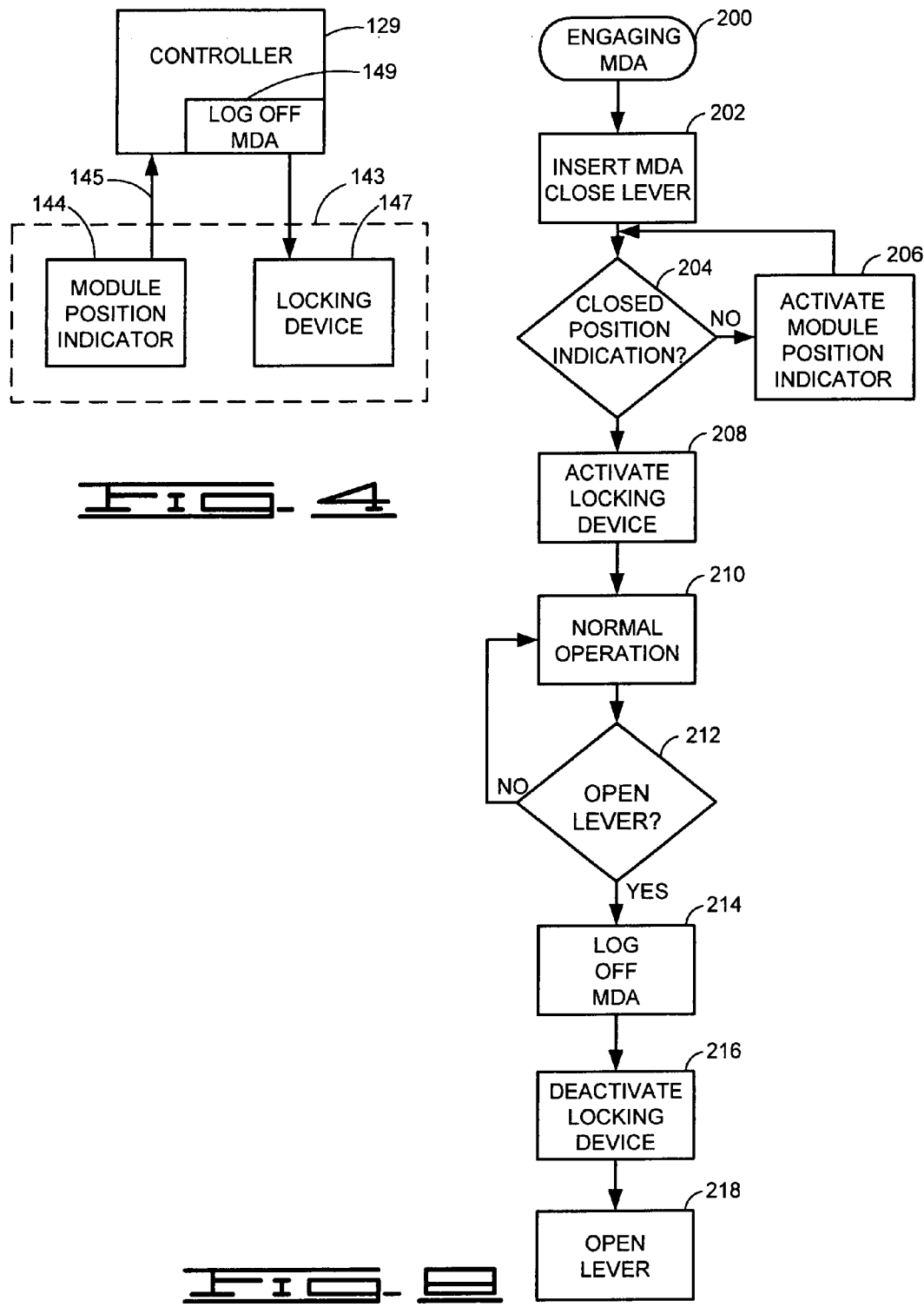
FIG. 4 is a diagrammatic representation of a control scheme in accordance with embodiments of the present invention.

FIG. 4 is a diagrammatical representation of the engagement assembly 143, comprising the module position indicator 144 and the locking device 147. The module position indicator 144, when acted on by the actuator 146, sends a signal 145 to the controller 129 indicating that the lever 134 is in the engaged position. The controller 129, in turn, energizes (or alternatively de-energizes) the locking device 147 to lockingly engage the lever 134 in the engaged position. Once lockingly engaged by the locking device 147, the MDA 102 is considered electrically engaged by the controller 129 for normal operation. Accordingly, one or more of the data storage devices 104 can be accessed in a data reading and writing relationship. Because these utilized data storage devices 104 can have data or pending commands stored in volatile memory, the controller 129 initiates an MDA 102 log off procedure 149 before the MDA 102 can be physically withdrawn from the array 100.

To remove the MDA 102 from the array 100, the actuator 146 can switch the module position indicator 144 to a disengaged signal. Accordingly, the signal 145 will cause the controller 129 to execute the MDA log off procedure 149. Subsequently, the controller 129 will signal the locking device 147 to unlock the lever 134 so that it can be moved to the disengaged position permitting removal of the MDA 102. Alternatively, an input device 150, such as an electrical switch or push-button, can be provided on the MDA 102 to signal the module position indicator 144 to the disengaged position.

Figure 5:
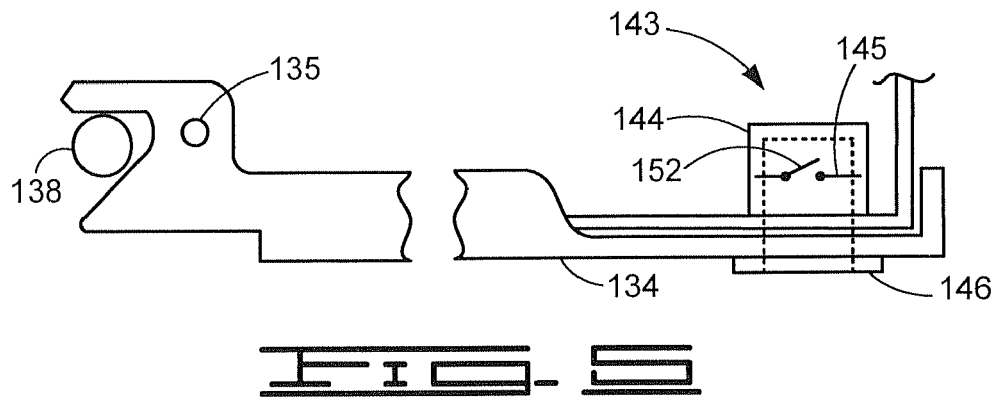
FIG. 5 is a segmented partially broken away view of an MDA position indicator in accordance with embodiments of the present invention.

FIG. 5 is a segmented, partially broken away view showing the module position indicator 144 of the engagement assembly 143 in accordance with embodiments of the present invention. Accordingly, in some embodiments the module position indicator 144 can comprise a housing supporting a switch 152 that is engageable by the actuator 146. For example, the actuator 146 can comprise a fastener, such as a threaded fastener, that is threadingly advanced, after the lever 134 is moved to the engaged position, to toggle the switch 152 in sending an engaged signal 145 to the controller 129. In alternative equivalent embodiments the actuator 146 can be a protuberant member, a latching member, or an electrically or magnetically engaging member or the like that triggers an appropriately configured switch 152.

Figure 6:
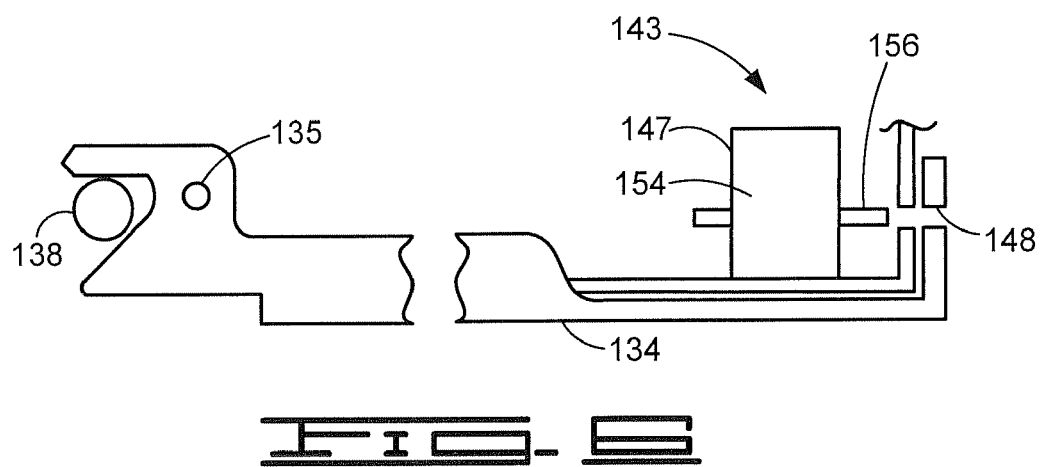
FIGS. 6 and 7 are segmented partially broken away views of a locking device in accordance with embodiments of the present invention.
Figure 7:
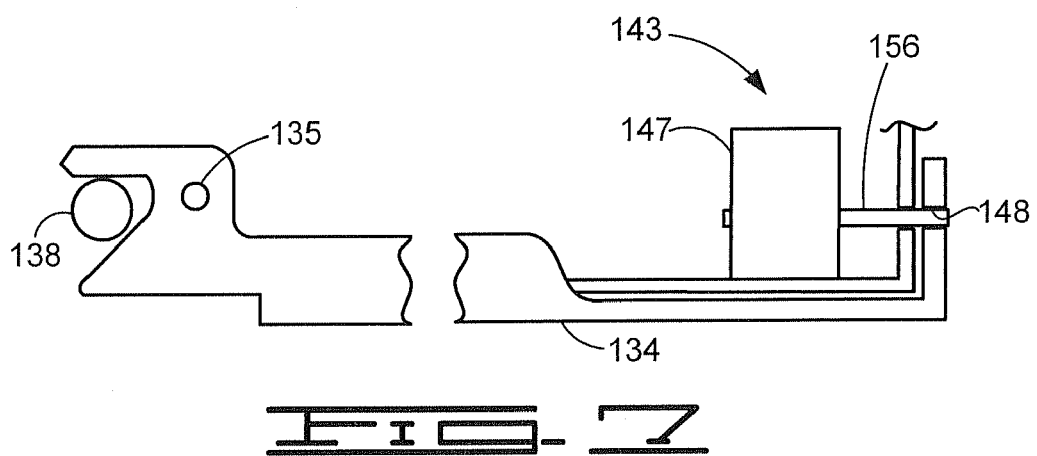

FIG. 6 is a segmented, partially broken away view showing the locking device 147 of the engagement assembly 143 in accordance with embodiments of the present invention. Accordingly, in some embodiments the locking device 147 comprises a solenoid 154 supporting an extensible latch 156. In the embodiments of FIG. 6 the latch 156 is in a withdrawn position so as to clearingly disengage the strike 148 of the lever 134. In this mode the MDA 102 is unlocked, in that the lever 134 is freely moveable to the disengaged position. FIG. 7 is a view similar to FIG. 6 but showing the locking device 147 having moved the latch 156 into receiving engagement within the strike 148 portion of the lever 134. In this mode the MDA 102 is locked, in that the lever 134 cannot be moved to the disengaged position until the locking device 147 again withdraws the latch 156.

FIG. 8 is a flowchart for a method 200 of ENGAGING MDA 102 illustrating steps for practicing embodiments of the present invention. In step 202 the MDA 102 is inserted into the opening 126 of the shelf 124 and the lever 134 is closed; in other words, the lever 134 is moved to the engaged position whereby the MDA 102 is controllably connected electrically with the backplane 128. In decision step 204 it is determined whether the actuator 146 indicates the engaged position of the lever 134. In some embodiments the actuator 146 signals the engaged position in conjunction with achieving the engaged position of the lever 134, such as by the use of a protuberant member triggering the switch 152. In other embodiments the actuator 146 is moved to an engaged position, such as by the use of a threaded fastener threadingly advancing to trigger the switch 152. If the decision block 204 yields a no, then control waits in block 206 for the module position indicator 144 to be satisfied. If yes, then control passes to block 208 which signals the locking device 147 to lock the lever 134 in the engaged position.

Normal operation of the array 100 begins in block 210 and continues until a signal is received in block 212 to open the lever 134; in other words, to move the lever 134 to the disengaged position. The log off procedure 149 is first executed in block 214, and then control passes to block 216 which deactivates the locking device 147 to unlock the lever 134. Finally, in block 218 the now unlocked lever 134 is freely moveable to the disengaged position to controllably retract the MDA 102 from the backplane 128.

Summarizing, an MDA (such as 102) is used for componentizing a number of data storage devices (such as 104) in an array (such as 100). The MDA is controllably insertable and retractable within a shelf (such as 124) supporting a backplane (such as 128) for electrical communication with a controller (such as 129) controlling top-level operations of the array.

6. An engagement assembly (such as 143) comprises a locking device (such as 147) that is responsive to a module position indicator (such as 144) in automatically locking and unlocking the MDA in the array. The MDA can comprise a controlled insertion lever (such as 134) that is moveable between a disengaged position and an engaged position, the disengaged position permitting removal of the MDA from the array and the engaged position urging the MDA into electrical engagement with the backplane. The locking device can comprise a solenoid (such as 154) supporting an extensible latch (such as 156) in receiving engagement within a strike (such as 148) portion of the lever. 5. The insertion lever can comprise an actuator (such as 146) that is moveable to an engaged position for engaging the module position indicator signaling the engaged position of the insertion lever. The locking device can be responsive to the module position indicator signaling the engaged position of the actuator in locking the insertion lever in the engaged position. The locking device can be responsive to a control (such as 129) that performs a shutdown procedure (such as 149) on the electronic module before unlocking the insertion lever.

In other embodiments an MDA comprises a locking device that is responsive to an insertion position indicator in automatically locking and unlocking the MDA in a cabinet.

In other embodiments a cabinet is provided establishing a locking engagement of a module by steps for engaging (such as 200) the module within a cabinet opening. The steps for engaging can be characterized by moving a controlled insertion member to a closed position to electrically engage the module with the cabinet (such as 202). The steps for engaging can be characterized by moving an actuator in relation to a module position indicator indicating the module is in electrical communication with the cabinet (204, 206). The steps for engaging can be characterized by moving a locking device to a locked position locking the controlled insertion member in the closed position (such as 208). The steps for engaging can be characterized by moving the actuator in relation to the module position indicator indicating a request to electrically disconnect the module from the cabinet (such as 212). The steps for engaging can be characterized by shutting down the module operations before moving the locking device to an unlocked position unlocking the controlled insertion member (such as 214, 216).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular configuration of the actuator device and locking device, and the control provided by the controller 129 may equivalently be performed by a controller within a data storage device 104 without departing from the spirit and scope of the present invention.

What is claimed is:

1. An engagement assembly for an electronic module that is receivingly engageable in a cabinet, the module having a handle that defines an aperture and that is pivotable between an engaged position and a disengaged position, the handle positions being associated with the module being disposed in communicatively engaged and disengaged positions with the cabinet, respectively, the engagement assembly comprising a locking device having an extensible latch supported within the module, said latch responsive to an actuator fixed in movement with the handle that is selectively engageable with a module position indicator at the engaged position of the handle to extend the latch into the aperture locking the handle in the engaged position, preventing the handle from being pivoted to the disengaged position until the latch is first retracted from the aperture.

2. The assembly of claim 1 wherein the actuator comprises a protuberant member that is movable by movement of the movable handle.

3. The assembly of claim 1 wherein the module position indicator comprises a proximity sensing device.

4. A multiple disc array (MDA) module comprising a handle that defines an aperture and that is pivotable between an engaged position and a disengaged position, the handle positions being associated with the module being disposed in communicatively engaged and disengaged positions in a cabinet, respectively, the module further comprising a locking device having an extensible latch supported within the module, said latch responsive to an actuator fixed in movement with the handle that is selectively engageable with a module position indicator at the engaged position of the handle to extend the latch into the aperture locking the handle in the engaged position, preventing the handle from being pivoted to the disengaged position until the latch is first retracted from the aperture.

5. The MDA of claim 4 wherein the actuator comprises a protuberant member that is movable by movement of the movable handle.

6. The MDA of claim 4 wherein the module position indicator comprises a proximity sensing device.

7. An engagement assembly for an electronic module that is receivingly engageable in a cabinet, the module having a handle that is pivotable between an engaged position and a disengaged position, the handle positions being associated with the module being disposed in communicatively engaged and disengaged positions with the cabinet, respectively, the engagement assembly comprising an actuator that is threadingly engageable with a module position indicator in the engaged position of the handle to automatically lock the handle in the engaged position, preventing the handle from being pivoted while locked.

8. A multiple disc array module comprising a handle that is pivotable between an engaged position and a disengaged position, the handle positions being associated with the module being disposed in communicatively engaged and disengaged positions in a cabinet, respectively, the module further comprising an actuator that is threadingly engageable with a module position indicator in the engaged position of the handle to automatically lock the handle in the engaged position, preventing the handle from being pivoted while locked.

* * * * *